June 17, 1930. P. ARNOTT 1,764,771
RACK FOR AUTOMOBILES
Filed March 16, 1929
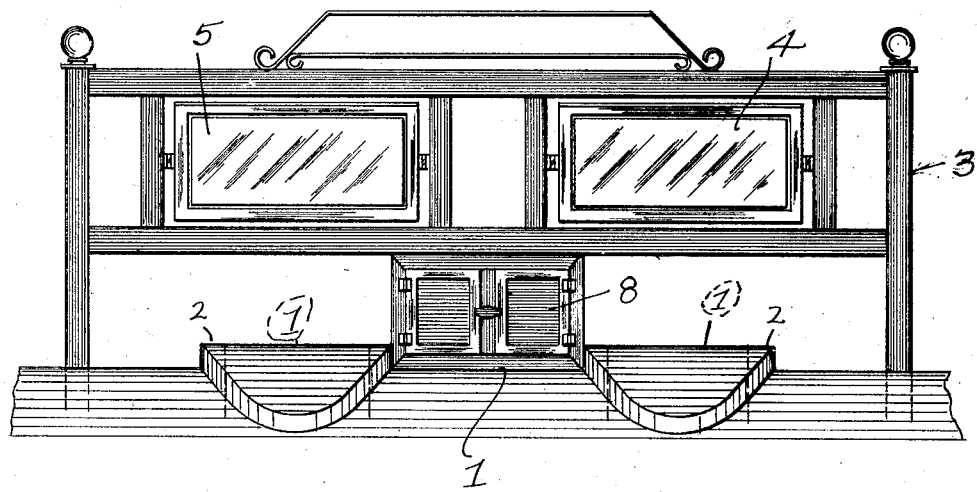
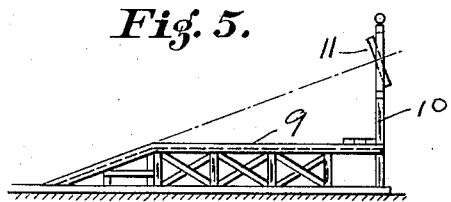
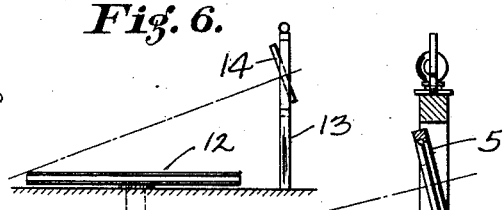
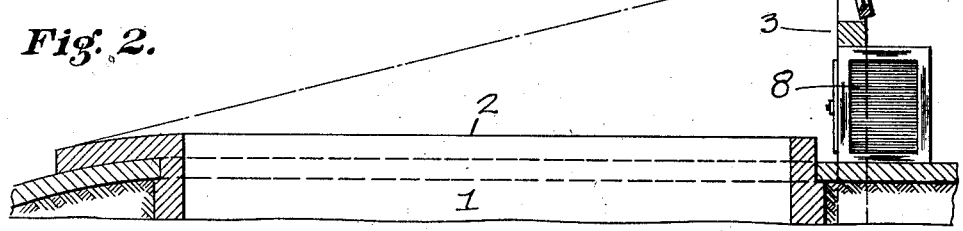
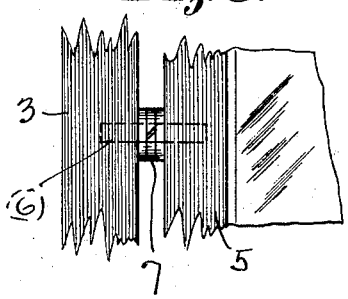
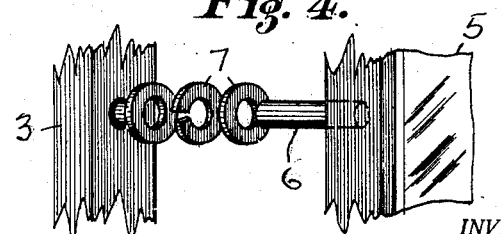
INVENTOR.
PETER ARNOTT
BY
ATTORNEYS.

Patented June 17, 1930

1,764,771

UNITED STATES PATENT OFFICE

PETER ARNOTT, OF PALO ALTO, CALIFORNIA

RACK FOR AUTOMOBILES

Application filed March 16, 1929. Serial No. 347,695.

This invention resides in the provision of an especially constructed mirror apparatus which is so combined with an automobile repair pit, or with a lubricating rack, stand, or platform, or with any other work station of this kind, that the driver when approaching or when over the pit, rack or like station, may at all times by looking ahead into the mirrors of said apparatus, have a clear vision of the area around the "stand" and under and rearward of the automobile, and thereby may easily, accurately and safely drive into proper position relative to said pit, stand, or other work station.

An object of the invention is to provide an apparatus arranged as above described, in which provision is made for effectively displaying advertising matter, and further, in which said apparatus may be arranged to provide tool and other storage receptacles handily located with reference to the repair pit, lubricating rack or other work station.

With the above mentioned and other objects in view, the invention consists in the novel construction and combination of parts hereinafter described, illustrated in the accompanying drawings, and set forth in the claims hereto appended, it being understood that various changes in the form, proportion, size and minor details of construction within the scope of the claims may be resorted to without departing from the spirit or sacrificing any of the advantages of the invention.

Referring to the drawings:

Fig. 1 is a front elevation of the apparatus of this invention as related to a repair or work pit.

Fig. 2 is a fragmentary longitudinal sectional view taken through the apparatus as shown in Fig. 1.

Fig. 3 is an enlarged fragmentary front elevation of the mirror mounting.

Fig. 4 is a perspective view of the mounting shown in Fig. 3, with the parts separated.

Fig. 5 is a side elevation of the apparatus of this invention as when related to a raised lubricating stand or platform.

Fig. 6 is a side elevation of the apparatus of the invention as when related to a vertically adjustable lubricating or work rack.

In the accompanying drawing I have illustrated a detailed form of my invention as related to various automobile work stations, such as a repair pit; an elevated lubricating or repair stand; and an elevator type of repair and grease rack.

In Figs. 1 and 2, I have shown the invention as including a repair pit 1, of the usual type having raised strips 2 along longitudinal edges, to serve as stops and guides for the wheels of the automobile. Near one end of the pit is an upright skeleton support or frame 3, of any suitable construction, on which mirrors 4 and 5 are mounted. These mirrors are mounted on horizontal trunnions 6 carrying spring washers 7, whereby the mirror will remain, by the friction action of said washers, in various positions of adjustments. The mirrors are set in position to reflect the area around the pit so that when an automobile is being driven, or otherwise moved and guided over the pit, the driver may, on looking ahead and into the mirrors, have a clear vision of the area around the pit and under the automobile, and particularly see that the wheels of the automobile are being properly guided with respect to the pit. In this way the driver may easily, quickly, accurately, and safely bring the automobile into proper position relative to the pit without turning his head and looking back, it only being necessary to look straight ahead into the mirrors, which mirrors are placed in the normal line of vision of the driver. Any number of mirrors may be used, dependent on the conditions at hand, although I have found that two mirrors arranged as shown, provide adequate rear vision with the ordinary repair pit.

The frame 3 may, if desired, be made of ornamental design, somewhat as shown, and the spaces of the frame around the mirrors and elsewhere when suitable, provide for an effective display of advertising matter, not shown.

A cabinet or like receptacle indicated at 8, may be built into the frame and when disposed as shown in Figs. 1 and 2, will provide a handy tool, or other storage, place, which may be reached by a worker standing in the pit.

As shown in Fig. 5, the apparatus of my invention includes a raised platform or stand 9, such as commonly used in repair and lubricating stations. A frame 10 at one end of the platform, supports the mirrors 11 in accordance with the invention as previously described. These mirrors show to the driver when approaching and driving upon the stand, the area around the stand and the wheels of the automobile so that the car may be easily and safely driven into proper position on the stand without requiring that the driver look backward.

In Fig. 6, I have shown the apparatus made up to include a vertically adjustable, or elevator type of lubricating or repair rack 12, such as often found in repair and lubricating stations. Near one end of this rack is the stand 13 supporting the mirrors 14 as hereinbefore described. By this arrangement the driver, on approaching and driving onto the stand, may, on looking ahead and into the mirrors, have a clear vision of the stand and area around it and also see the wheels of the car whereby an easy positioning of the car on the rack will be provided for.

The apparatus of this invention is simple, inexpensive and capable of being easily, and quickly set up for use, not only as hereinbefore explained, but may be effectively used in small garages, narrow driveways, and other places where vision of the area under and rearward of the car is essential to safe and accurate driving. Thus the apparatus shows to the driver, while the latter is driving on or over the "station" area, an image of the area and of a wheel of the automobile, with relation to said area, said images being presented in the normal line of vision of the driver.

I claim:

1. Apparatus of the character described comprising the combination of an area over which an automobile must be brought into a definite position, of a mirror support located adjacent to said area, and a mirror on said support disposed substantially in the normal line of vision of the driver of an automobile during the approach of the latter to and the movement thereof into position over said area, which mirror is set to reflect an image showing said area and the position of a wheel of the automobile relative to said area.

2. Apparatus of the character described comprising the combination of an area over which an automobile must be brought into a definite position, of a mirror support located adjacent to said area, a mirror on said support disposed substantially in the normal line of vision of the driver of an automobile during the approach of the latter to and the movement thereof into position over said area, which mirror is set to reflect an image showing said area and the position of a wheel of the automobile relative to said area; and a storage chamber carried by said support in position to be accessible to a person beneath the automobile while in said area.

3. In apparatus of the character described, the combination with a repair or work station onto which an automobile must be moved to permit the worker to operate beneath the automobile, of a mirror support located near said station; and a mirror on said support, which mirror is disposed to reflect an image showing a part of said station, together with a front wheel of said automobile during the movement of said automobile into said station.

4. In apparatus of the character described the combination with a repair or work station onto which an automobile must be moved to permit the worker to operate beneath the automobile, of a mirror support located near said station; and a mirror on said support, which mirror is disposed to reflect an image showing a part of said station, together with a front wheel of said automobile, during the movement of said automobile into said station, said mirror being in the normal line of vision of the driver of the automobile while the latter is being driven into position relative to said station.

5. In apparatus of the character described the combination with a repair or work station onto which an automobile must be moved to permit the worker to operate beneath the automobile, of a mirror support located near said station, of mirrors independently adjustably mounted on said support, which mirrors are disposed to reflect an image showing a part of said station over which the automobile is being moved, together with wheels on opposite sides of said automobile, while the automobile is being driven onto said station.

6. In a reflecting device for runways of service stations, the combination with the tracks of a gasoline and oil service runway, of a reflecting member in advance of the far end of the runway, and means for supporting the reflecting member in a position whereby the tracks are discernible in the member by the automobile operator.

7. The combination with a runway of an automobile service station having tracks and a space there between for the service mechanic of a reflecting member at a point beyond the far ends of the tracks, and means for supporting the reflecting member in a position, whereby the tracks are discernible therein, allowing the wheels of the automobile to be guided on and from the tracks.

In testimony whereof, I have hereunto set my hand at Palo Alto, California.

PETER ARNOTT.